April 12, 1932. R. V. HUTCHINSON 1,853,616
MEANS FOR MINIMIZING TORSIONAL VIBRATIONS Filed March 26, 1928

Inventor
Roland V. Hutchinson

By Blackmore, Spencer & Hiuh
Attorneys

Patented Apr. 12, 1932

1,853,616

UNITED STATES PATENT OFFICE

ROLAND V. HUTCHINSON, OF LANSING, MICHIGAN, ASSIGNOR, BY MESNE ASSIGNMENTS, TO PACKARD MOTOR CAR COMPANY, OF DETROIT, MICHIGAN, A CORPORATION OF MICHIGAN

MEANS FOR MINIMIZING TORSIONAL VIBRATIONS

Application filed March 26, 1928. Serial No. 264,853.

This invention relates to means for minimizing torsional vibrations in shafts of engines or other machines, and is particularly adapted to automobile engines having a fan belt pulley on the front end of the crank shaft.

Objects of the invention, among others, are to control torsional vibrations in crank shafts without the necessity of modifying the normal balance of the shaft and to provide an attachment which may be applied to any standard crank shaft; also to utilize the fan pulley and its hub as a support and housing for the balancing mechanism.

The invention consists in the construction more particularly described in the ensuing specification, defined in the appended claims and illustrated in the accompanying drawings, in which:

Figure 1:
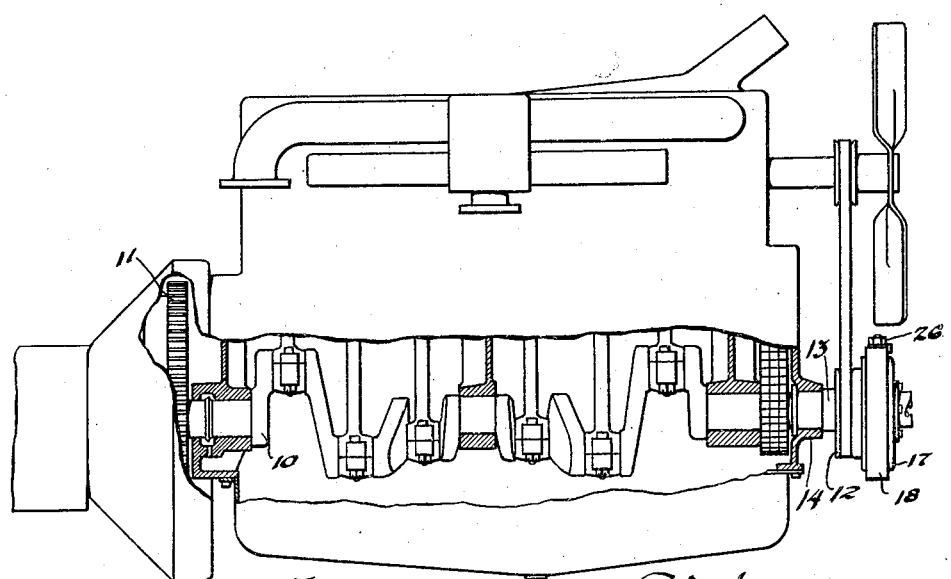
Fig. 1 is a side elevation of an engine partly in section, having an embodiment of the invention attached.
Figure 2:
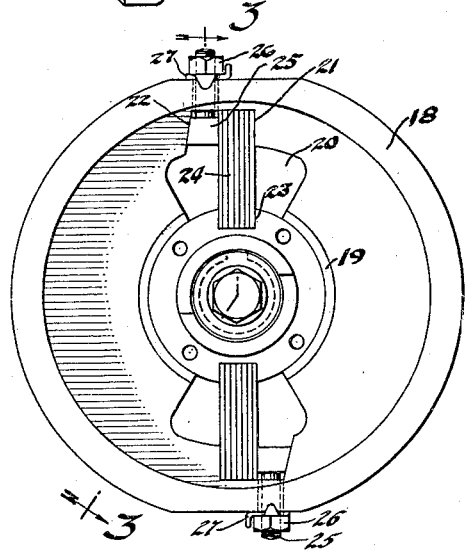
Fig. 2 is a front elevation of the balancer, the front cover plate being removed.
Figure 3:
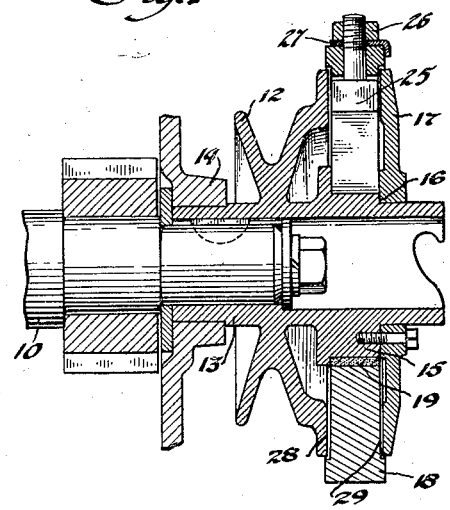
Fig. 3 is a section through a fan pulley and torsional balancer, constructed in accordance with this invention.

Figure 1 illustrates a conventional engine having six cylinders in line, a crank shaft 10 having a flywheel 11 rigidly secured to its rear end and a fan pulley 12 fixed rigidly to its front end outside of the engine casing as is usual. In this invention the fan pulley is combined with a support and housing for a torsion balancer. Said pulley is provided with a hollow hub portion 13 projecting rearwardly within a bearing 14 in the crank case, and a portion projecting toward the front as illustrated in Figure 3. The bore of the hub portion 13 receives the front end of crank shaft 10 and serves as the front journal of the shaft. The forwardly projecting portion of the pulley hub is enlarged exteriorly as at 15 to form a bearing surface for a balancing body and has a reduced portion forming a shoulder as at 16, against which is fitted a cover plate 17, which protects the front side of the balancing body to be presently described.

The balancing body or mass consists of a wheel-like body 18 having a web portion and a rim portion, journaled upon the bearing 15, preferably through the intermediary of a bushing 19 of porous oil absorbent material. This balancing mass 18 is cut away to provide one or more recesses as shown at 20. In the form preferred there are two of these cut away portions diametrically opposite as shown. Forming a part of the wall of each of said recesses or openings 20 is a shoulder 21, parallel with a diameter, and on the opposite wall is a shoulder 22, inclined away from shoulder 21 in a direction toward the center of the mass. The enlarged bearing 15 is notched as at 23 to receive the inner ends of leaf springs 24 which are seated snugly therein. The outer ends of the spring bear against the shoulders 21. These springs are locked in place by any suitable means. The means shown consist of a wedge bolt or bolts 25 having a shank extending through a suitable opening in the rim of the mass and a head bevelled on one side and engaging the inclined surface 22. Each wedge bolt may be tightened to its seat by means of a nut 26, and may be locked in position by a lock washer 27. It will be understood that the orifice through which a bolt passes is slightly larger than the bolt shank. Spring 24 is preferably composed of a series of leaves, so that leaves may be added or subtracted to vary the spring characteristics if desired.

The mass 18 is guided between smooth surfaces 28 and 29 on the fan pulley and cover plate 17 respectively, which may be slightly spaced therefrom if the friction in the damper is found to be excessive.

I have shown one specific embodiment of my invention in order to comply with the patent statutes, but it will be obvious that changes may be made to fit particular conditions without departing from the spirit of the invention.

I claim:

1. In means for controlling torsional vibrations of a crank shaft, a housing member fixed to the shaft, a torsion balancing mass guided by the housing member, leaf springs, each having one end secured to the housing and the other end secured to the balancing mass.

2. In means for controlling torsional vibrations of a crank shaft, the combination of a shaft with a torsion balancing mass symmetrically balanced around the crank shaft axis and steadied by a bearing, said balancing mass having a cut away portion, a leaf spring disposed in said cut away portion, one end of said spring being fixed with respect to the shaft, and a wedge for clamping the other end of the spring to the balancing mass.

3. In means for controlling torsional vibrations of a crank shaft, a fan pulley fixed to the front end thereof, said fan pulley having a hub comprising a bearing member projecting forward, a torsion balancing mass having a bearing on said bearing member, springs disposed between the pulley and torsion balancing mass, one end of each spring being connected to the bearing member and the other end to the balancing mass, and a cover plate secured to the hub, said cover plate and the front face of the pulley guiding the balancing mass.

4. In means for controlling torsional vibrations of a crank shaft, a housing member having a hub portion secured to the shaft and providing a bearing, a balancing mass journaled on said bearing within said housing, and radially disposed springs connecting said hub portion to the balancing mass.

5. In means for controlling torsional vibrations in an engine crank shaft, the combination with a shaft, of a pulley having a hub portion rigidly secured to the shaft, a balancing mass journaled on said hub portion adjacent the face of said pulley, a member secured to said hub portion forming with said pulley a housing for said balancing mass, and radially disposed springs within said housing connecting the hub portion to said mass.

6. In means for controlling torsional vibrations in an engine crank shaft, the combination with a shaft, of a housing rigidly secured to the shaft, a balancing mass journaled in said housing about the shaft axis and having a portion guided by said housing, and radially disposed leaf springs within the housing connecting the balancing mass thereto.

7. In means for controlling torsional vibrations in an engine shaft, the combination with the shaft, of a power transmitting member having a hub rigidly secured to the shaft, said hub having radially disposed notches, a balancing mass having a rim portion and a web portion journaled on said hub and having cut-away portions, a member secured to the power transmission member and forming therewith a housing for the balancing mass adapted to guide and retain said mass in its bearing, and springs in said cut-away portions seated at one end in said notches and removably connected at the other end to the web portion adjacent said rim.

8. In means for controlling torsional vibrations of a crank shaft, a housing member fixed to the shaft, a torsion balancing mass guided by the housing member, and leaf springs within said housing member each having one end secured to the housing and the other end secured to the balancing mass.

In testimony whereof I affix my signature.

ROLAND V. HUTCHINSON.